B. T. TRUEBLOOD.
Medicine-Spoon.

No. 222,549.  Patented Dec. 9, 1879.

WITNESSES:
C. Neveux
C. Sedgwick

INVENTOR:
B. T. Trueblood
BY Munn & Co
ATTORNEYS.

UNITED STATES PATENT OFFICE.

BARCLAY T. TRUEBLOOD, OF HADLEY, INDIANA.

IMPROVEMENT IN MEDICINE-SPOONS.

Specification forming part of Letters Patent No. 222,549, dated December 9, 1879; application filed August 11, 1879.

*To all whom it may concern:*

Be it known that I, BARCLAY T. TRUEBLOOD, of Hadley, in the county of Hendricks and State of Indiana, have invented a new and Improved Medicine-Spoon, of which the following is a specification.

The invention consists in a bowl provided with flanges, in combination with a cover fitting over bowl and sliding under its flanges, as hereinafter more fully described.

Figure 1:
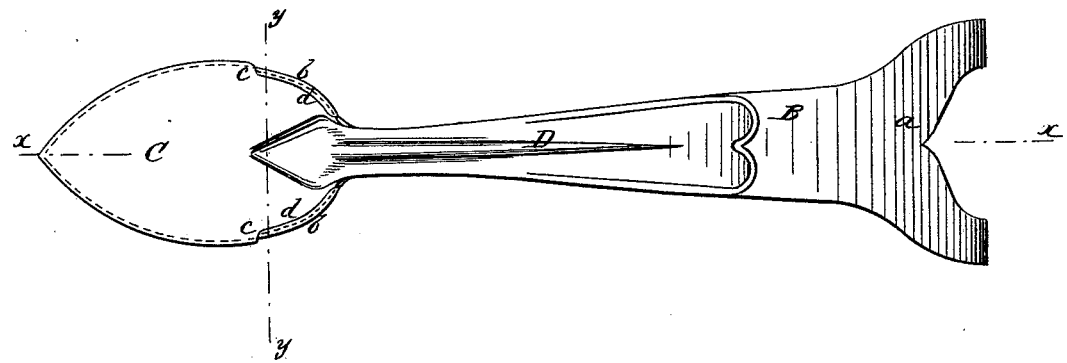
Figure 2:
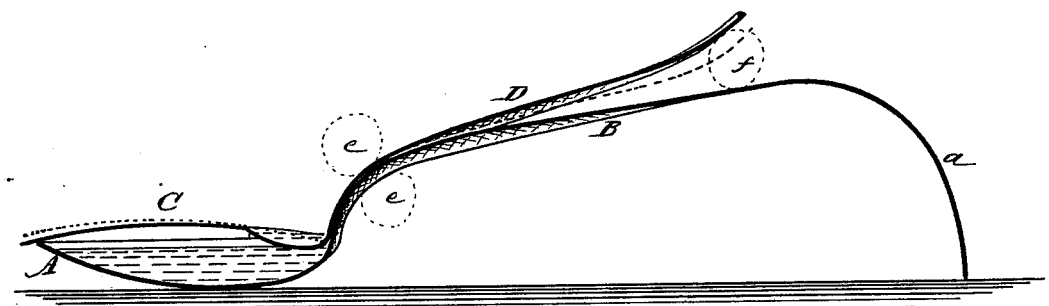
Figure 3:

In the accompanying drawings, Figure 1 is a top plan of my improvement. Fig. 2 is a longitudinal section thereof on line $x\ x$ of Fig. 1, and Fig. 3 is a cross-section of the bowl on line $y\ y$ of Fig. 1.

Similar letters of reference indicate corresponding parts.

In the drawings, A is the bowl of the spoon. B is the handle, the end whereof is bent down to form a two-part extension, $a$, so that when set on a flat surface the bowl is held perfectly level, as shown in Fig. 2, by which arrangement, when the medicine has been placed in the spoon it can be set down for any purpose without danger of the contents spilling out.

The edges of the bowl, for a short distance from either side of the handle, are provided with narrow inwardly-projecting flanges $b\ b$.

C is the cover, of the same shape precisely as the bowl of the spoon, but much flatter and a little larger around to the points $c\ c$, where the edges are cut away around to the handle D, so that these portions $d\ d$ of the cover will pass under the flanges $b\ b$. The handle D lies up over the handle B.

The cover is adapted to make a close water-tight joint with the edges of the bowl.

The manner of using this spoon is as follows: When the medicine has been placed in the spoon the cover is placed over it and pushed back until edges $d\ d$ pass under flanges $b\ b$ as far as the shoulders $c\ c$ will allow, and the handles B D are then clasped close to the bowl between the thumb and middle finger, (indicated by the dotted lines $e\ e$,) while the forefinger $f$ is inserted between the two handles, and being forced down acts as a wedge to force the cover in close contact with the edges of the bowl. In this position it is held until the spoon is inserted between the lips and teeth and into the patient's mouth, when, by slipping the forefinger back slightly and pressing on handle D with the thumb, the cover is opened sufficiently, as shown by the dotted lines, to allow the medicine to run out into the patient's throat.

In this way medicines can be easily and without waste administered to infants and others who resist their administration, and also to those who cannot be raised to an upright position.

Having thus described my invention, what I claim as new, and desire to secure by Letters Patent, is—

As an improvement in medicine-spoons, the bowl A, provided with flanges $b\ b$, in combination with the cover C, adapted to fit over the bowl A, with the reduced edges $d\ d$ sliding freely under flanges $b\ b$, and provided with the handle D, whereby the said cover is adapted to be closed tightly over the bowl to prevent the escape of the medicine, and opened when inserted in the patient's mouth, in the manner substantially as described.

BARCLAY TENNYSON TRUEBLOOD.

Witnesses:
ADDISON COFFIN,
NATHAN D. ALBERTSON.